United States Patent [19]

Kawamura et al.

[11] Patent Number: 5,802,242

[45] Date of Patent: Sep. 1, 1998

[54] METHOD OF AND APPARATUS FOR REVERSE PLAYBACK OF A TIME-DIVISION-MULTIPLEXED SIGNAL

[75] Inventors: Makoto Kawamura; Yasushi Fujinami, both of Kanagawa, Japan

[73] Assignee: Sony Corporation, Tokyo, Japan

[21] Appl. No.: 842,318

[22] Filed: Apr. 24, 1997

Related U.S. Application Data

[62] Division of Ser. No. 593,706, Jan. 29, 1996.

[30] Foreign Application Priority Data

Jan. 31, 1995 [JP] Japan .................. 7-032940

[51] Int. Cl.$^6$ .................................. H01N 5/783
[52] U.S. Cl. ........................... 386/68; 386/111
[58] Field of Search ............... 386/68, 81, 111, 386/112, 125, 126, 46; 369/32, 48; H04N 5/783

[56] References Cited

U.S. PATENT DOCUMENTS

| 5,305,113 | 4/1994 | Iwamura et al. ............ 386/111 |
| 5,596,564 | 1/1997 | Fukushima et al. .......... 386/111 |

*Primary Examiner*—Thai Tran
*Assistant Examiner*—Huy Nguyen
*Attorney, Agent, or Firm*—Frommer Lawrence & Haug LLP; William S. Frommer

[57] ABSTRACT

A method of and apparatus for reverse playback, slow-reverse playback, and frame-by-frame-reverse playback of a time-division-multiplexed signal is compatible with fixed-rate and variable-rate data compression schemes, including digital video signals encoded according to MPEG systems.

4 Claims, 15 Drawing Sheets

FIG. 7
(PRIOR ART)

| Packet Start Code Prefix | ID | Length | **** ID | **** Packet Type | Current # Data Streams | Current # Video Streams | Current # Audio Streams | -3 | -2 | -1 | +1 | +2 | +3 |
|---|---|---|---|---|---|---|---|---|---|---|---|---|---|

Position Information of Entry Points

METHOD OF AND APPARATUS FOR REVERSE PLAYBACK OF A TIME-DIVISION-MULTIPLEXED SIGNAL

This application is a division of application Ser. No. 08/593,706, filed Jan. 29, 1996.

BACKGROUND OF THE INVENTION

This invention relates to a method of and apparatus for decoding an encoded, time-division-multiplexed signal for display to a user in reverse playback, slow-reverse playback, and frame-by-frame-reverse playback modes of operation. Specific embodiments provide for the decoding of encoded audio and video time-division-multiplexed signals.

Devices for reproducing video signals from a storage device, such as a video cassette recorder (VCR), commonly feature user-controlled reproduction functions. Such functionality includes reverse playback, slow-reverse playback, and frame-by-frame-reverse playback in addition to standard playback, fast-forward, and fast-reverse capabilities. With the development of digital video signal recording technology, it is expected that digital video signal reproduction devices will provide similar playback functionality with improved image quality. However, such functionality, coupled with enhanced image quality, is difficult to achieve due to the inherent operation of prevalent digital video signal encoding schemes. Typical encoding schemes, such as those developed by MPEG (Motion Picture Coding Experts Group), generally operate to highly compress video information to facilitate its transmission over channels of very limited bandwidth.

According to the MPEG system, video and audio data are compressed and recorded on a storage device in a time-division-multiplexed format. FIGS. 1A, 1B, and 1C illustrate an MPEG data format. FIG. 1A shows a unit of multiplexed data comprised of at least one "pack" of information and an end code. Each pack includes a pack header and at least one "packet" of information. In a unit of multiplexed data, the length of each pack may vary.

As depicted in FIG. 1B, a pack header can include a pack start code, a system clock reference (SCR) indication, and an indication of the multiplexing rate (MUX RATE). Each packet is typically comprised of a packet header and a segment of coded packet data. FIG. 1C illustrates a sample packet header comprised of a packet start code prefix, a stream identification code (ID), an indication of the length of the packet or the length of following packets (LENGTH), a decoding time stamp (DTS), and a presentation time stamp (PTS). The stream identification code is utilized to identify the packet, indicate the type of the packet, and/or indicate the particular type of data in the packet. For example, stream identification codes may indicate an audio stream, a video stream, a reserved stream, a reserved data stream, a private stream, a padding stream, or the like.

According to a straightforward MPEG implementation, given a set of video images divided into a series of frames, each frame can be coded as an intraframe-coded picture (I picture), an interframe forward-predictive-coded picture (P picture), or an interframe bidirectionally-predictive-coded picture (B picture). Intraframe coding is achieved by compressing data representing a particular frame solely with respect to the data of that frame. Consequently, an I picture can be fully decoded from the data representing the I picture to produce the original frame of video data.

In contrast, interframe forward-predictive coding of a frame is obtained by determining the differences between the frame and a preceding (base) frame which is to be encoded as an I picture or as a P picture. The frame to be coded is represented by data corresponding to these differences to produce a P picture. To decode the P picture, the base frame (I picture or P picture) with reference to which it was coded must be decoded first. The decoded base frame is then modified according to the data of the P picture to recover the original frame. The advantage of interframe forward-predictive coding is that it usually achieves greater compression efficiency than intraframe coding.

A frame can be bidirectionally-predictive-coded by determining differences between it and a combination of an immediately preceding frame which is to be coded as an I or P picture and an immediately succeeding frame which is to be coded as an I or P picture. The frame to be coded is represented by data corresponding to these differences to produce a B picture. To decode the B picture, the preceding and succeeding frames with reference to which it was coded must be decoded first. A combination of the decoded preceding and succeeding frames is then modified according to the data of the B picture to recover the original frame. The advantage of interframe bidirectionally-predictive coding is that it often achieves greater compression efficiency than interframe forward-predictive coding.

An example of the interrelationships among I pictures, P pictures, and B pictures produced according to the MPEG standard are provided in FIG. 2A. In this example, a group of pictures (Group A) is comprised of 15 pictures produced by encoding 15 frames of image data (not shown). The interrelationships, specifically the pattern of predictive coding, are indicated by arrows in this diagram.

Intraframe-coded picture $I_2$ is coded with respect to only the data of that frame. Interframe forward-predictive-coded picture $P_5$ is coded with respect to the data used to produce picture $I_2$. Picture $P_8$ is coded with respect to the data used to produce picture $P_5$. Interframe bidirectionally-predictive-coded pictures $B_3$ and $B_4$ are each coded with respect to the data used to produce pictures $I_2$ and $P_5$. Similarly, pictures $B_6$ and $B_7$ are each coded with respect to the data used to produce pictures $P_5$ and $P_8$. In this manner, each of the pictures in Group A is produced. Note also that the data used to produce the last P picture of Group A, $P_{14}$, is also used to code pictures $B_0'$ and $B_1'$ of a succeeding group.

According to the MPEG1 video standard (ISO11172-2) and the MPEG2 video standard (ISO13818-2) the pictures of FIG. 2A are rearranged for decoding left-to-right, as shown in FIG. 2B, for normal (forward) video playback. This rearrangement facilitates the decoding of predictive-coded frames (P pictures and B pictures) only after the intraframe-coded picture (I picture) or interframe forward-predictive-coded picture (P picture) with reference to which they were coded are decoded. For example, picture $I_2$ must be decoded before picture $P_5$ can be decoded because the coding of picture $P_5$ depends upon the uncoded frame of data used to produce picture $I_2$. As a further example, both pictures $I_2$ and $P_5$ must be decoded before pictures $B_3$ and $B_4$ can be decoded because the coding of pictures $B_3$ and $B_4$ depend upon the uncoded frames of data used to produce pictures $I_2$ and $P_5$. The different grouping of pictures in group B reflects this rearrangement. Further, in FIG. 2B, the picture indicated at $B_{12}"$ and $B_{13}"$ are from a group that preceded Group A in FIG. 2A prior to the rearranging for decoding.

FIG. 3 illustrates a series of coded video data as it may be stored on a recording medium. The series is comprised of groups of pictures, Groups #0, 1, ..., J, wherein each group includes pictures coded in accordance with an MPEG standard, e.g. I pictures, P pictures, and B pictures. As depicted in this example, each group begins with an I picture which is followed by an alternating series of B pictures and P pictures. Each group may also include a group header (not shown). A typical group header is comprised of a group start code (GSC), a time code (TC), a closed group of pictures indication (CG), and a broken link indication (BC).

A simple apparatus proposed for decoding time-division-multiplexed data is illustrated in FIG. 4. The apparatus is comprised of a digital storage device 100, a signal separating unit 21, a video decoder 25, and an audio decoder 26. Device 100 stores data in the general time-division-multiplex format depicted in FIGS. 1A, 1B, and 1C. Signal separating unit 21 accesses and reads the stored data, separates the data into audio and video components, and supplies the components to respective signal decoders. Video decoder 25 and audio decoder 26 decode coded video and coded audio signals, respectively, to produce respective video output signals and audio output signals.

Signal separating unit 21 includes a header separating circuit 22, a switch 23, and a control apparatus 24. Header separating circuit 22 detects pack header and packet header data in the stream of data read from device 100 and supplies the headers to control apparatus 24. The time-division-multiplexed data is supplied to an input of switch 23. One output of switch 23 is coupled to video decoder 25 while the other output is coupled to audio decoder 26.

Control apparatus 24 issues commands controlling the accessing of data in storage device 100 and controlling the operation of switch 23. The control apparatus 24 reads the stream identification code contained in each packet header and controls switch 23 to route the corresponding packet of data to the appropriate decoder. Specifically, when the stream identification code indicates that a packet contains video signals, the packet is routed to video decoder 25. When the stream identification code indicates that a packet contains audio signals, the packet is routed to audio decoder 26. In this manner, time-division-multiplexed data is separated into audio and video components and appropriately decoded.

If the video data stored in storage device 100 is coded and arranged according to an MPEG standard as shown in FIG. 3, then the operations of accessing specific video frames (random access) and searching or scanning through the video frames will be inherently limited by the decoding speed of video decoder 25. To achieve faster frame accessing and image reproduction, it has been proposed that the video decoder skip certain coded pictures during such decoding operations.

Since only I pictures can be decoded independent of other frames of image data, video decoder 25 may decode and output only the stored I pictures to achieve a video search (video scan) function. Alternatively, the signal separating unit 21 may be modified to pass only I pictures to video decoder 25 during a search (scan) operation. Control apparatus 24 controls data storage device 100 to supply the signal separating unit those portions of video data containing I pictures of interest. Typically, in search (scan) mode, the audio decoder 26 is muted.

To randomly access a particular stored video frame for decoding and display, it has been proposed that the two I pictures located immediately adjacent, e.g. one before and one after, the selected frame be decoded. From these two I pictures, and, in certain instances, a number of the intermediate P pictures, the desired frame can be decoded. Of course, where the selected frame has been coded as an I picture, only that picture need be decoded. In an application utilizing a fixed data coding rate and a regular coding pattern, the location of each I picture can be obtained by direct calculation.

However, where the rate of data encoding varies or a varying coding pattern is utilized, the locations of the I pictures cannot be determined with the same direct calculation and instead additional information must be considered. Generally, MPEG systems encode data at a varying rate. Therefore, a system such as that of FIG. 3, in carrying out a random data access or searching through stored data by displaying only the I pictures, would need to examine each stored picture to determine the locations of the I pictures. Such a process is necessarily time consuming.

To minimize the time required to search stored video data encoded at a varying rate, two different data systems have been proposed which associate additional information with the stored data to facilitate the determination of I picture locations.

One such system is illustrated in FIG. 5 and is comprised of a digital storage device 100, a signal separating circuit 64, a video decoder 25, an audio decoder 26, and a main controller 67. In this system, a "table of contents" is stored in device 100 which identifies the location of each I picture of video data stored in device 100. By consulting this table of contents, the main controller determines the locations of I pictures quickly, enabling quick accessing, decoding, and display of such pictures. As a result, searching and random access functions can be achieved with reduced processing time.

Device 100 stores video data in a time-division-multiplex format and stores a table of contents identifying the locations of I pictures included in the stored video data. Signal separating unit 64 accesses and reads the stored data; separates the data into audio, video, and table-of-contents components, supplies the audio and video components to respective signal decoders, and supplies the table-of-contents data to main controller 67. Video decoder 25 and audio decoder 26, in response to control signals from main controller 67, decode coded video signals and coded audio signals, respectively, to produce respective video output signals and audio output signals.

Main controller 67 supplies access command signals to digital storage device 100 to cause the device to access and supply specified segments of stored data to signal separating circuit 64. In turn, the storage device provides the main controller with position information (data retrieval information), which may be in the form of actual data addresses within the device, regarding the data to be accessed. Also, the controller supplies command signals to each of video decoder 25 and audio decoder 26 to control the decoding operations performed by each. Additionally, controller 67 includes a table-of-contents (TOC) memory 68 for storing table-of-contents data.

Signal separating unit 64 includes a header separating circuit 22, a switch 23, a control apparatus 66, and a table-of-contents (TOC) separator 65. Circuit 22 and switch 23 operate in the same manner as described in connection with FIG. 4. Apparatus 66 is the same as control apparatus 26 with the exception that control apparatus 66 does not control the accessing of stored data. Table-of-contents (TOC) separator 65 detects table-of-contents information supplied with the audio and video data and supplies the table-of-contents information to TOC memory 68.

In response to a search command from a user, main controller 67 issues a command to initiate the supply of stored data from digital storage device 100 to signal separating circuit 64. Table-of-contents data is detected by TOC separator 65 and supplied to TOC memory 68. Utilizing the table-of-contents data to determine the locations of I pictures in the video data, main controller 67 controls video decoder 25 to decode only I picture data and skip other data. Audio decoder 26 is muted. Alternatively, main controller 67 controls digital storage device 100 to access and supply only I picture video data to signal separating circuit 64. By both methods, the location of I picture data is identified relatively quickly and only I picture data is decoded and output for display.

Unfortunately, the storage of table-of-contents data requires significant storage capacity in some video data applications. As a consequence, the storage of the location of every I picture has been determined to be impractical. Proposed systems which store only some of the I picture locations have also been contemplated. Inherently, these systems are unable to conduct precise search operations, resulting in significant search delay. Such delay is undesirable.

According to a second proposed data decoding system for accessing stored I pictures with greater speed, data is stored according to the format illustrated in FIGS. 6 and 7 and is decoded by an apparatus depicted in FIG. 8.

In FIG. 6, a data pack (or sector) is constructed of a pack header, a first video packet, an entry packet, a second video packet, and an audio packet, in that order. Each video packet includes a video packet header and a segment of video data. Each audio packet includes an audio packet header and a segment of audio data. An I picture, the location of which is referred to as an "entry point," is located at the beginning of the video data segment in the second video packet. The entry packet stores information regarding the location of one or more I pictures in that pack, the locations of I pictures in any number of packs, or like information.

FIG. 7 illustrates an entry packet format in which information regarding the locations of six consecutive entry points, three before the packet and three after, are stored in the packet. The entry packet includes a packet header, as described hereinabove, formed of a packet start code prefix, an identification code, and an indication of the length of the packet. The entry packet further includes additional identification information (ID), packet type information, an indication of the current number of data streams, an indication of the current number of video streams, and an indication of the current number of audio streams. At the end of the packet, position information for six entry points is stored.

The decoding apparatus of FIG. 8 is comprised of a digital storage device 100, a signal separating circuit 70, a video decoder 25, and an audio decoder 26. Signal separating circuit 70 includes a header separating circuit 71, a switch 23, a control apparatus 72, and an entry point memory 73.

In response to an access command from control apparatus 72, device 100 supplies stored data to header separating circuit 71. Header separating circuit 71 detects pack header data, packet header data, and entry packet data in the stream of data read from device 100 and supplies such data to control apparatus 72. The time-division-multiplexed data is supplied to an input of switch 23. One output of switch 23 is coupled to video decoder 25 while the other output is coupled to audio decoder 26.

Control apparatus 72 issues commands controlling the accessing of data in storage device 100 and controlling the operation of switch 23. The control apparatus reads the stream identification code contained in each packet header and controls switch 23 to route the corresponding packet of data to the appropriate decoder. Specifically, when the stream identification code indicates that a packet contains video signals, the packet is routed to video decoder 25. When the stream identification code indicates that a packet contains audio signals, the packet is routed to audio decoder 26. In this manner, time-division-multiplexed data is separated into audio and video components and appropriately decoded.

Further, control apparatus 72 receives entry packet data, analyzes the data, and supplies entry point information derived from the entry packet data to entry point memory 73 for storage. Control apparatus 72 also receives data retrieval information from storage device 100. Depending upon the application, data retrieval information might be correlated with entry point information to determine actual locations of the entry points within the storage device. These actual locations may also be stored in memory 73 as entry point information. In this manner, entry point memory 73 is loaded with the locations of I pictures stored in storage device 100.

In a search mode, control apparatus 72 determines the current data retrieval position of storage device 100 from the data retrieval information supplied therefrom. The control apparatus then retrieves from entry point memory 73 information pertinent to the entry point located nearest to but before the current data retrieval position of the storage device. Data storage device 100 is controlled by apparatus 72 to immediately change its data retrieval position to that of the identified entry point. Data is reproduced from that point, e.g. the I picture is reproduced, and supplied to signal separating circuit 70 for processing and, thereafter, display.

For example, if the entry packet of FIG. 6 is simply a marker indicating that the succeeding video packet begins with an entry point, then data retrieval can be started at a point located immediately after the location of the entry packet. If, instead, the entry packet is constructed as in FIG. 7, the entry point information is processed to determine the next data retrieval location. Subsequent entry points are determined either from further information retrievals from entry point memory 73 or from analysis of entry packet information stored at the currently accessed entry point. In this manner, I picture data are rapidly retrieved and reproduced in an efficient search operation.

Although the proposed systems described hereinabove can display I pictures in a rapid manner, none are able to effectively achieve reverse playback, slow-reverse playback, and frame-by-frame-reverse playback modes of operation utilizing B pictures and P pictures, as well as I pictures, so as to produce high resolution search mode images for display.

OBJECTS AND SUMMARY OF THE INVENTION

An object of the present invention is to provide a method of and apparatus for decoding an encoded, time-division-multiplexed video signal for display to a user in reverse playback, slow-reverse playback, and frame-by-frame-reverse playback modes of operation.

More specifically, it is an object of the present invention to provide a method of and apparatus for reverse playback, slow-reverse playback, and frame-by-frame-reverse playback of video data encoded according to an MPEG standard.

Another object of the present invention is to provide a method of and decoding apparatus for frame-by-frame-reverse playback of video data encoded with interframe correlation, e.g. B pictures and P pictures, to produce high resolution images.

A further object of the present invention is to provide a method of and decoding apparatus for frame-by-frame-reverse playback of video data with minimum processing delay apparent to a user.

In accordance with an aspect of the present invention, an apparatus for the decoding and reverse playback of an encoded digital signal comprised of a plurality of data units and stored in a digital storage device is provided. Given that a reverse playback operation commences at a data unit, a retrieving device retrieves from the digital storage device a preceding data unit that immediately precedes said data unit in a forward playback order. The retrieving device retrieves decoding data stored in the digital storage device that is needed to decode the preceding unit. A decoding device, coupled to the retrieving device, decodes the preceding data unit as a function of the decoding data.

In accordance with another aspect of the present invention, an apparatus for decoding and reverse reproducing of an encoded digital signal comprised of a plurality of data units and stored in a digital storage device at a plurality of respective data locations is provided. Given that a reverse playback operation commences at a data unit, a memory device stores a first data location of a first decoding data unit which can be utilized in the decoding of the data unit. A retrieving device retrieves from the digital storage device at the first data location the first decoding data unit and retrieves from the digital storage device a preceding data unit that immediately precedes the data unit in a forward playback order. A decoding device decodes the preceding data unit as a function of the first decoding data unit.

In accordance with still another aspect of the present invention, a method of decoding and reverse reproducing an encoded digital signal comprised of a plurality of data units and stored in a digital storage device is provided. Given that a reverse playback operation commences at a data unit, the first step of the method is retrieving from the digital storage device a preceding data unit that immediately precedes the data unit in a forward playback order and retrieving decoding data stored in the digital storage device that is needed to decode the preceding unit. The next step is decoding the preceding data unit as a function of the decoding data.

In accordance with yet another aspect of the present invention, a method for decoding and reverse reproducing an encoded digital signal comprised of a plurality of data units and stored in a digital storage device at a plurality of respective data locations is provided. Given that a reverse playback operation commences at a data unit, the first step of the method is storing a first data location of a first decoding data unit which can be utilized in the decoding of the data unit. The next step is retrieving from the digital storage device at the first data location the first decoding data unit and retrieving from the digital storage device a preceding data unit that immediately precedes the data unit in a forward playback order. The next step is decoding the preceding data unit as a function of the first decoding data unit.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIG. 7 is a diagram of another data format;

DETAILED DESCRIPTION OF THE PREFERRED EMBODIMENTS

Figure 9:
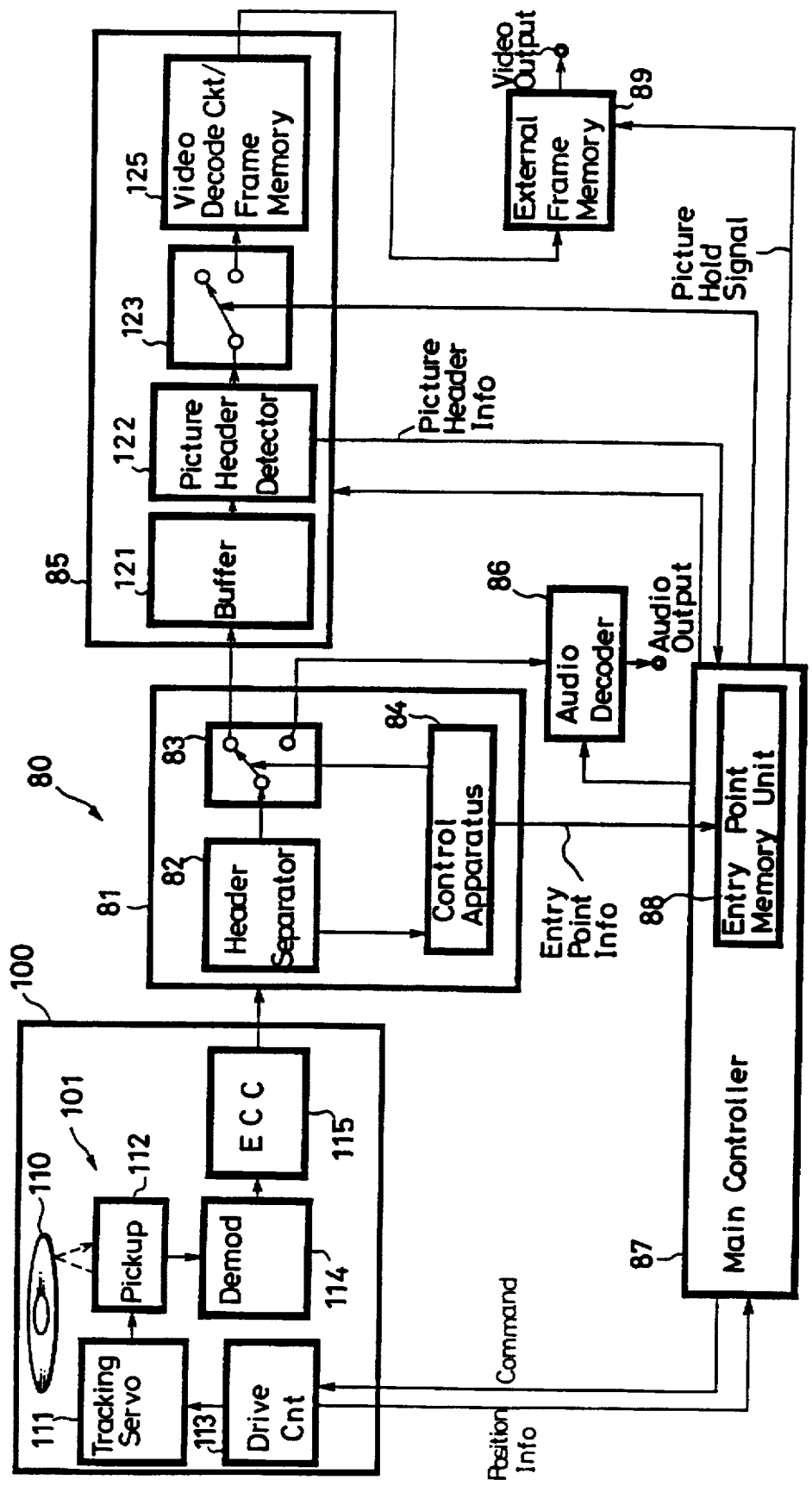
FIG. 9 is a block diagram of an audio and video data decoding apparatus for reverse playback of a time-division-multiplexed signal according to an embodiment of the present invention.

An apparatus for reverse playback of a time-division-multiplexed signal according to an embodiment of the present invention is illustrated in FIG. 9 and generally indicated at 80. The apparatus 80 is comprised of a digital storage device 100, a demultiplexer 81, a video decoder 85, an audio decoder 86, a main controller 87, and an external frame memory 89.

Digital storage device 100 accesses stored digital data as directed by command signals supplied from main controller 87. The reproduced digital data is supplied to demultiplexer 81 which separates the data into its various components. Video data components are supplied to video decoder 85 for selective decoding. Audio data components are supplied to audio decoder 86 for decoding. Entry point information is supplied from a control apparatus 84 in demultiplexer 81 to an entry point memory unit 88 contained within main controller 87. Main controller 87 controls the operation of digital storage device 100, video decoder 85, and external frame memory 89 to decode stored video data for display in forward and reverse playback modes.

Digital storage device 100 is for storing digital data and retrieving digital data from storage. Device 100 may be comprised of a video tape recording/reproducing device, an integrated circuit memory, or the like. Preferably, as illustrated, the digital storage device is comprised of an optical disk storage system 101. Video data stored in device 100 includes a variety of header data which will be described in detail in the following.

Optical disk storage system 101 is comprised of an optical disk storage medium 110, a tracking servo circuit 111, a pickup device 112, a drive controller 113, a demodulator 114, and an error correction circuit (ECC) 115. Medium 110 is utilized to store digital data. Drive controller 113 controls the operation of system 101 in accordance with control commands received from main controller 87. Specifically, controller 113 directs the operation of and monitors the data accessing position of pickup 112 through tracking servo circuit 111. Controller 113 outputs data retrieval information regarding the position of pickup 112 to main controller 87.

Tracking servo circuit 111 controls the location of pickup device 112 so that specified regions of medium 110 are accessed by device 112. Device 112 reads digital data stored on medium 110 and supplies the reproduced digital data to demodulator 114. Demodulator 114 demodulates the reproduced signal to produce a demodulated signal which is supplied to ECC 115. ECC 115 detects and corrects errors in the demodulated signal and supplies the corrected digital signal to demultiplexer 81.

Demultiplexer 81 includes a header separating circuit 82 and a switch 83, as well as the control apparatus 84. In response to an access command from main controller 87, device 100 supplies reproduced data to header separating circuit 82. Header separating circuit 82 detects pack header data, packet header data, and entry packet data in the stream of data read from device 100 and supplies such data to control apparatus 84. Header separating circuit 82 also detects the time-division-multiplexed data in the reproduced data and supplies the multiplexed data to an input of switch 83. One output of switch 83 is coupled to video decoder 85 while the other output is coupled to audio decoder 86.

Control apparatus 84 reads stream identification codes contained in each packet header and controls switch 83 to route the corresponding packet of data to the appropriate decoder. Specifically, when a stream identification code indicates that a packet contains video signals, the packet is routed to video decoder 85 for decoding to produce a decoded video signal. When the stream identification code indicates that a packet contains audio signals, the packet is routed to audio decoder 86 for decoding to produce an audio output signal. In this manner, time-division-multiplexed data is separated into audio and video components and appropriately decoded.

Additionally, control apparatus 84 receives entry packet data, analyzes the data, and supplies entry point location information derived from the entry packet data to entry point memory 88 for storage. Main controller 87 receives data retrieval information from storage device 100. Depending upon the application, data retrieval information might be correlated with entry point information to determine the actual locations of the entry points within the storage device. The data retrieval position information and/or the actual locations determined therefrom may also be stored in memory 88 as entry point information. In this manner, entry point memory 88 is loaded with information relating to the locations of I pictures stored in storage device 100.

Video decoder 85 is comprised of a buffer 121, a picture header detector 122, a switch 123, and a signal decoder 125. Video data received through switch 83 is temporarily stored in buffer 121. The video data stored in buffer 121 is read out by picture header detector 122 and examined for picture headers and group-of-picture (GOP) headers. Typically, picture header information is comprised of temporal reference (TR) information, indicative of the order of pictures within a group of pictures, and picture type information, indicating whether a picture is an I picture, a P picture or a B picture. For example, temporal reference information may include a timestamp, a serial number, or the like assigned in an order, such as the left-to-right order of pictures in FIG. 2A. A GOP header may include an identification of the group of pictures and may occur once in a group or be associated with each picture in the group. If the GOP header is associated with individual pictures, the header may indicate the first group of pictures which includes data needed for decoding the individual picture. A preferred picture header format is defined in the MPEG1 video standard (ISO11172-2) and the MPEG2 video standard (ISO13818-2). The detected headers are supplied to main controller 87.

Picture header detector 122 supplies video picture data to an input of switch 123. One output of switch 123 is coupled to signal decoder 125, while the other output is left unconnected or otherwise appropriately terminated to prevent further signal propagation. As a function of the header information received from picture header detector 122, main controller 87 controls the operation of switch 123 to pass only certain pictures of video data to signal decoder 125 as needed for each particular operational mode. Video data pictures that are not to be decoded at a particular processing step are connected to the signal termination output and thus discarded.

Signal decoder 125 includes a frame memory and operates to decode coded video picture data. In a preferred embodiment, the frame memory within the signal decoder has at least three memory planes. It is further preferred that the signal decoder decodes data coded according to the MPEG2 video standard. Decoded video data is supplied to external frame memory 89.

External frame memory 89 receives the decoded video data and outputs the data as a video output signal in response to a control signal from main controller 87. During normal operation, memory 89 outputs received video data immediately. During a picture hold operation, as indicated by a picture hold signal supplied by main controller 87, memory 89 holds and repeatedly outputs a particular picture of video data. Additional video data received during a picture hold operation may also be stored by memory 89.

In a playback operation, main controller 87 issues commands controlling the accessing of data in storage device 100 and configures video decoder 85 and audio decoder 86 for decoding data. Where digital storage device 100 is comprised of an optical disk storage system 101, main controller 87 issues control commands to drive controller 113 to access particular segments of stored data. Accordingly, drive controller 113 controls tracking servo circuit 111 to appropriately position pickup 112 with respect to disk 110. Following changing of the position of pickup 112, the drive controller supplies data retrieval information regarding the position of the pickup to main controller 87. Such data retrieval information may include actual address information for data on the disk being accessed. Data read from optical disk 110 is supplied to demultiplexer 81. Demultiplexer 81 separates the data into its constituent parts and appropriately routes the video data, the audio data, and the entry point information.

In the "normal" (forward) playback mode, main controller 87 controls switch 123 to route all of the video data to signal decoder 125 for decoding and enables external frame memory 89 to immediately output the decoded video data. Audio decoder 86 decodes the audio data to produce the audio output signal. Video decoder 85, in conjunction with external frame memory 89, produces the video output signal.

Concurrent with the playback of decoded data, main controller 87 stores entry point information from control apparatus 84 in entry point memory 88. Corresponding data retrieval information from digital storage device 100 may also be stored as or with entry point information. Further, main controller 87 continuously receives picture header information from picture header detector 122 and retains picture header information reflecting the nature of the coded picture then being displayed. For each new picture, the picture header information retained by main controller 87 is updated.

A frame-by-frame-reverse playback operation, which preferably occurs following a normal playback operation, will be described in the following. Reverse playback, slow-reverse playback, average-speed-reverse playback operations, and the like are achieved by repeating, at appropriate intervals, the frame-by-frame-reverse playback operation described below. Accordingly, only the frame-by-frame-reverse playback operation will be described in the following in detail. As will be appreciated by one of ordinary skill, implementation of other reverse playback operations simply involves a repetitive application of the teachings below.

Figure 10:
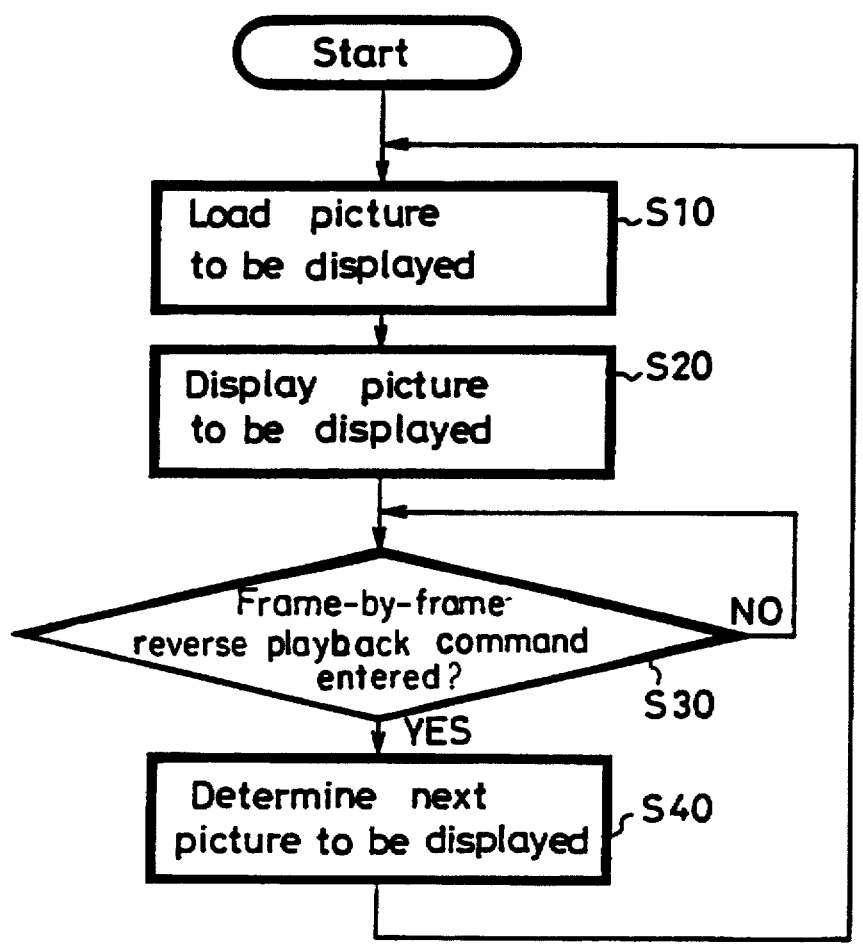
FIG. 10 is a flow chart to which reference will be made in describing the operation of the apparatus of FIG. 9.

A general overview of the frame-by-frame-reverse playback operation is illustrated in the flowchart of FIG. 10. In the first step S10, main controller 87 controls apparatus 80 to retrieve from storage and decode a coded picture of video data. In step S20, the decoded picture is displayed to the user. A user command to produce frame-by-frame-reverse playback is entered in step S30. Finally, in step S40, the next picture to be displayed is determined and the processing operation cycles back to step S10. Detailed explanation of this process is provided in the following.

In response to a user command for frame-by-frame-reverse playback, main controller 87 issues a picture hold signal to external frame memory 89. External frame memory 89 holds the current picture being displayed and repeatedly outputs that same picture. As a function of the entry point information stored in entry point memory 88 and of the temporal reference information extracted from the picture header information stored for the displayed picture, temporal reference information regarding the immediately preceding picture is determined. As a simple example, where temporal reference information consists of integer numbers assigned in order, the temporal reference number corresponding to the displayed picture can be decremented by one to produce the temporal reference number of the immediately preceding picture. This immediately preceding picture will be referred to as the "target picture" in the case of frame-by-frame reverse playback.

It is assumed in the foregoing that the apparatus had been recently operated in the forward playback mode of operation so that a picture is currently being displayed and so that entry point information has been stored in memory 88. However, the invention is not limited to operation under these assumptions. If no picture is being displayed at the time a user command for frame-by-frame-reverse playback is entered, a single picture of video data may first be retrieved from device 100, decoded, and displayed prior to further processing. If an insufficient amount, or no entry point information has been stored, apparatus 80 can fast-reverse scan the stored video data to retrieve such information, as needed, without displaying the scanned video data. A fast-forward scan returns the storage device to the location of the displayed picture. Alternatively, the entry point information may be retrieved as a processing step in the frame-by-frame-reverse playback operation described below.

The entry point for a group of pictures to which the target picture belongs, e.g. the location of the first I picture in the group, is also determined from the stored entry point information and the stored temporal reference information. In this discussion, a target picture "belongs" to a group of pictures if the target picture is one of the pictures in the group or if the decoding of one of the pictures in the group is needed in order to decode the target picture. As an example of this determination process, if the picture at the entry point was used to decode the picture being displayed, that picture also is likely to be needed to decode the target picture. Such an entry point will be referred to as the "access point." A group of pictures to which the target picture belongs will be referred to as the "target group." Thus, the entry point for the target group is the access point.

Figures 1A, 1B, 1C:
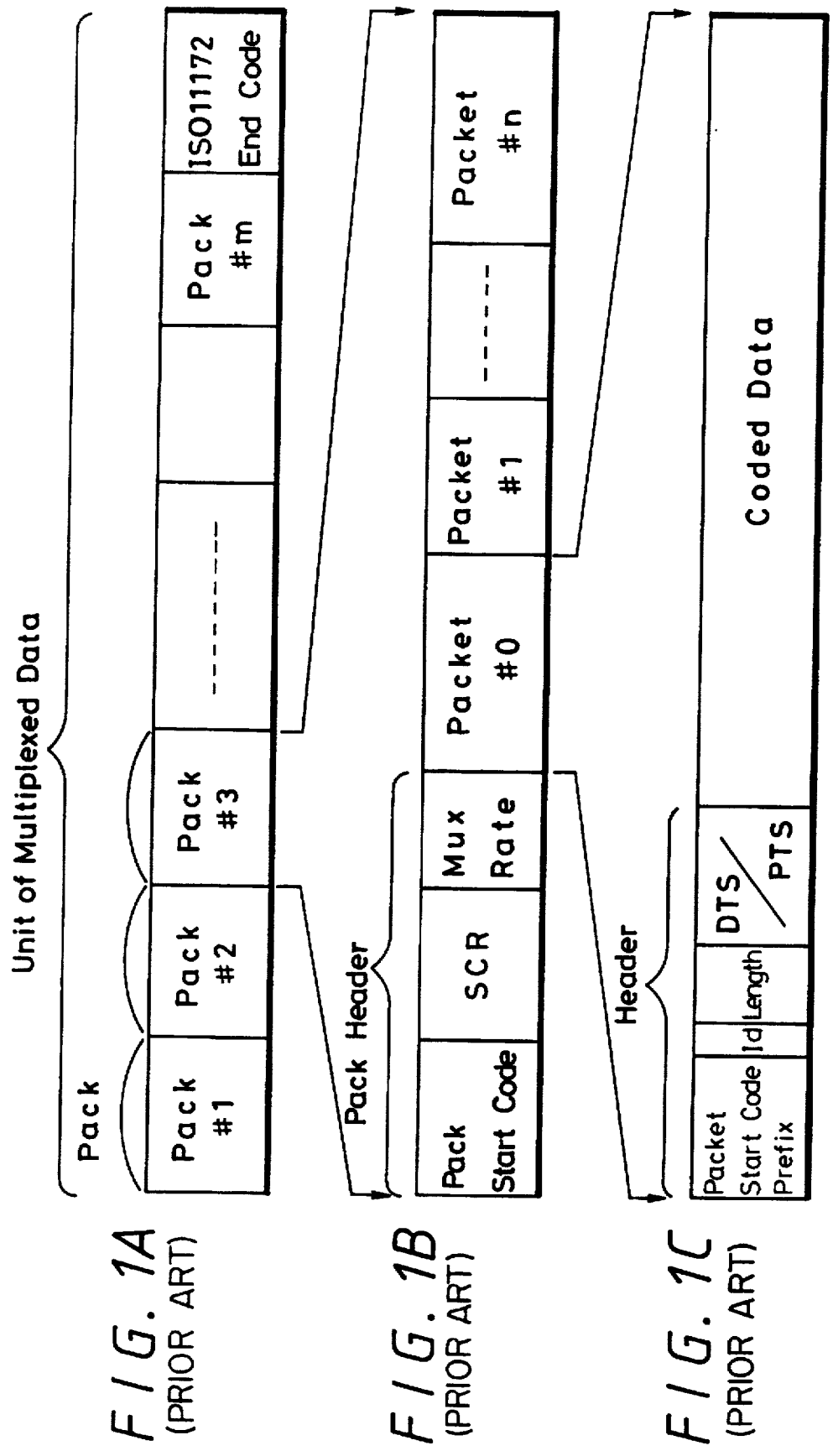
FIGS. 1A, 1B, and 1C are diagrams of a data format.
Figure 2A:
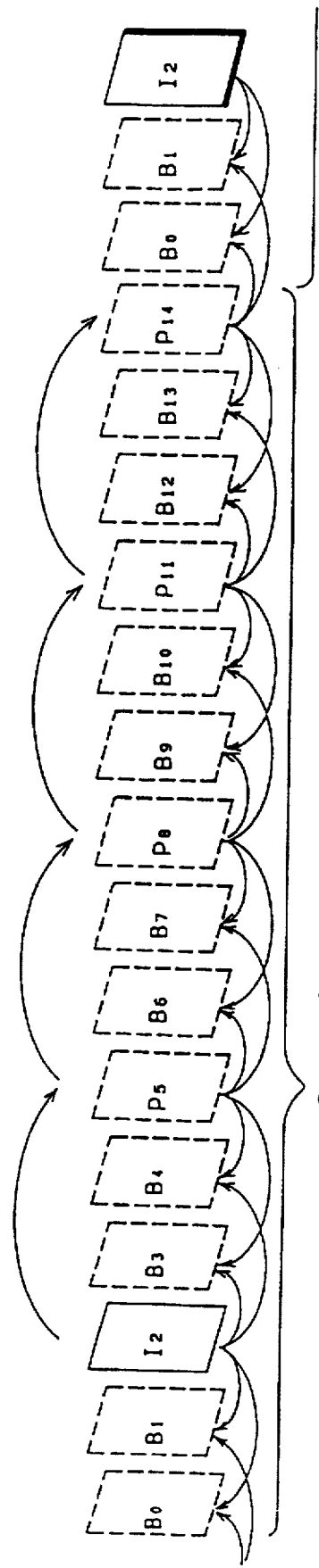
FIG. 2A is a diagram illustrating an MPEG encoding method.

However, the decoding of certain target pictures require decoded picture data from two adjacent groups of pictures. Hence, such target pictures "belong" to more than one target group. In the example of FIG. 2A, pictures $B_0$ and $B_1$ require information from the frames coded as pictures $I_2$ and $P_{14}$" (not shown) on FIG. 2B. In this discussion, such pictures will be presumed to belong to, and thus have header information consistent with, the first group of pictures from which data is needed to decode the pictures. Nonetheless, other definitions for such pictures are possible. Careful data processing is needed to accommodate target pictures of this type.

Figure 11:
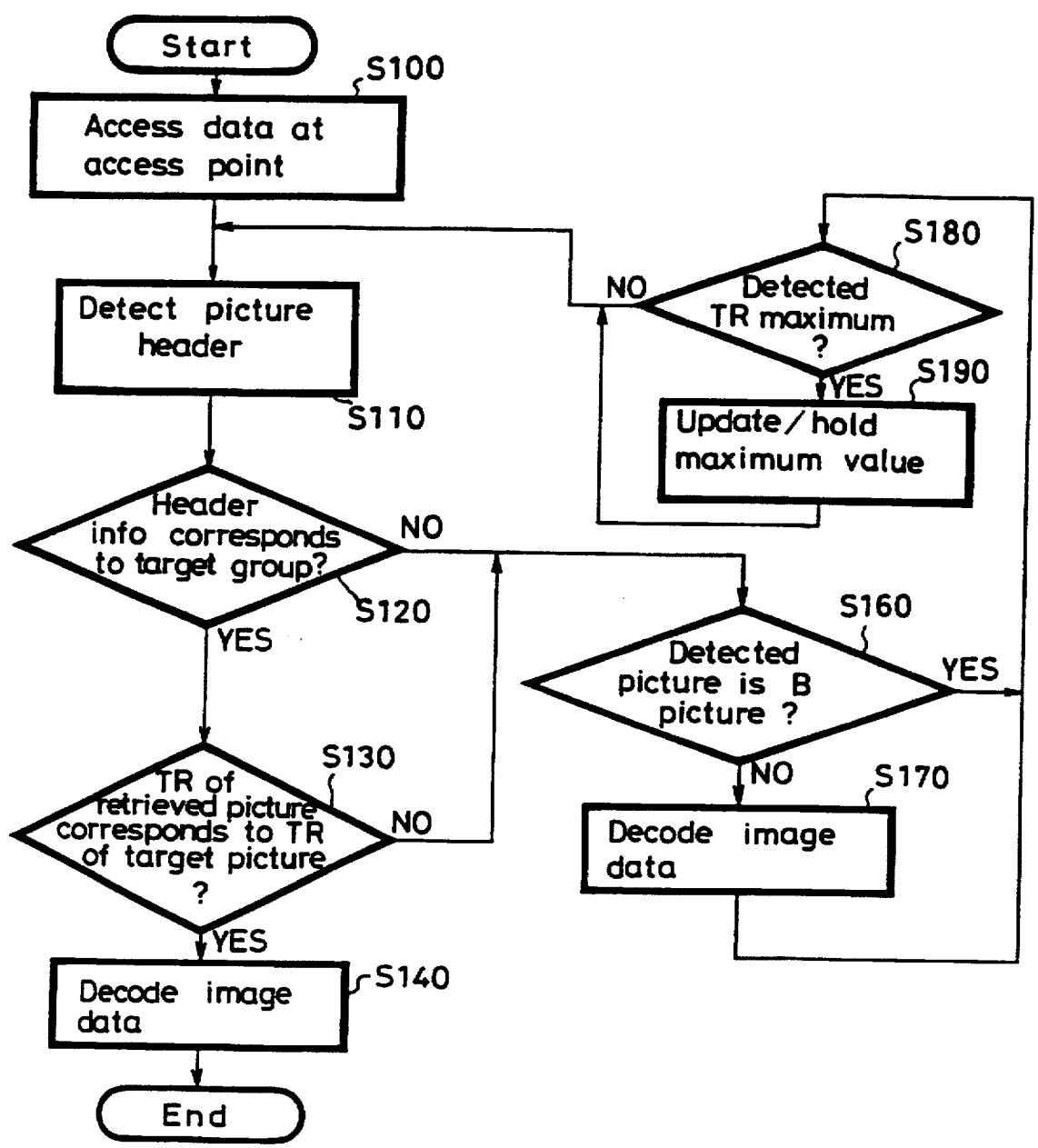
FIG. 11 is a flow chart to which reference will be made in describing the operation of the apparatus of FIG. 9.

Operation of apparatus 80 in accordance with step S10 and step S20 will be further described in connection with the flowchart of FIG. 11. In step S100, main controller 87 supplies a seek command to digital storage device 100 to access data stored at the access point. The data is supplied through demultiplexer 81 to video decoder 85. In step S110, the picture header of the picture stored at the access point is detected by picture header detector 122. Optionally, GOP header information at the access point is retrieved also.

The picture header information is supplied to main controller 87 which determines, in step S120, whether the detected picture header corresponds to the target group. Alternatively, GOP header information is also supplied to main controller 87 and correlated with the target group. If the header information corresponds to the target group, then processing proceeds with step S130; otherwise, processing proceeds with step S160. A lack of correspondence indicates that the target picture belongs to a preceding group of pictures. Optionally, where there is no correspondence and the target picture is a B picture that requires the decoding of data from a preceding group of pictures in order to be decoded, the access point is reset to the immediately preceding group of pictures.

In step S130, main controller 87 compares the temporal reference value of the detected picture with the temporal reference value of the target picture. If the two temporal reference values correspond, e.g. are equal, then the target picture has been reached and processing proceeds with step S140. Otherwise, processing proceeds with step S160.

In step S140, main controller 87 controls switch 123 to route the retrieved picture data of the target picture to signal decoder 125 which decodes the picture data. The decoded picture data is supplied to external frame memory 89 and main controller 87 controls memory 89 to display the newly decoded picture repetitively, continuously, or otherwise.

In step S160, if data of the detected picture is not needed for decoding the target picture, e.g. the detected picture is a B picture, main controller 87 controls switch 123 to discard the data of the detected picture and processing proceeds with step S180. Otherwise, switch 123 is controlled to supply the detected picture to signal decoder 125 for decoding and temporary storage in step S170. Additionally, in the case where the detected picture is an I picture, the temporal reference value of the picture is stored by main controller 87. The detected picture is decoded because decoding of the target picture relies upon data decoded from the detected picture, e.g. in the examples above the decoding of a B picture relies upon data decoded from the previous I picture and from intervening P pictures. Following such decoding, processing proceeds with step S180.

In some applications, step S180 and step S190 may not be needed and consequently processing proceeds with step S110 where the header(s) of the next picture are detected. In step S180, the temporal reference value of the detected picture is compared to the maximum value attainable as a temporal reference value ($TR_{MAX}$). Such a maximum value may correspond to the last picture in the group of pictures. If the two values are equal, processing proceeds with step S190; otherwise, processing proceeds according to step S110 and the header(s) of the next picture are detected.

Alternatively, in step S180 the TR value of the detected pictures is monitored and if the TR value of the detected pictures is greater than the current maximum TR value, then processing proceeds with step S190. Otherwise, processing proceeds with step S110.

In step S190, if the next detected picture is at the beginning of the next group of pictures, e.g. is an I picture or includes a GOP header, then the temporal reference value of the target picture is updated to reflect its original temporal reference value. Processing proceeds with step S110 and the header(s) of the next picture are detected. Alternatively, the maximum TR value is updated and held.

Figure 12:
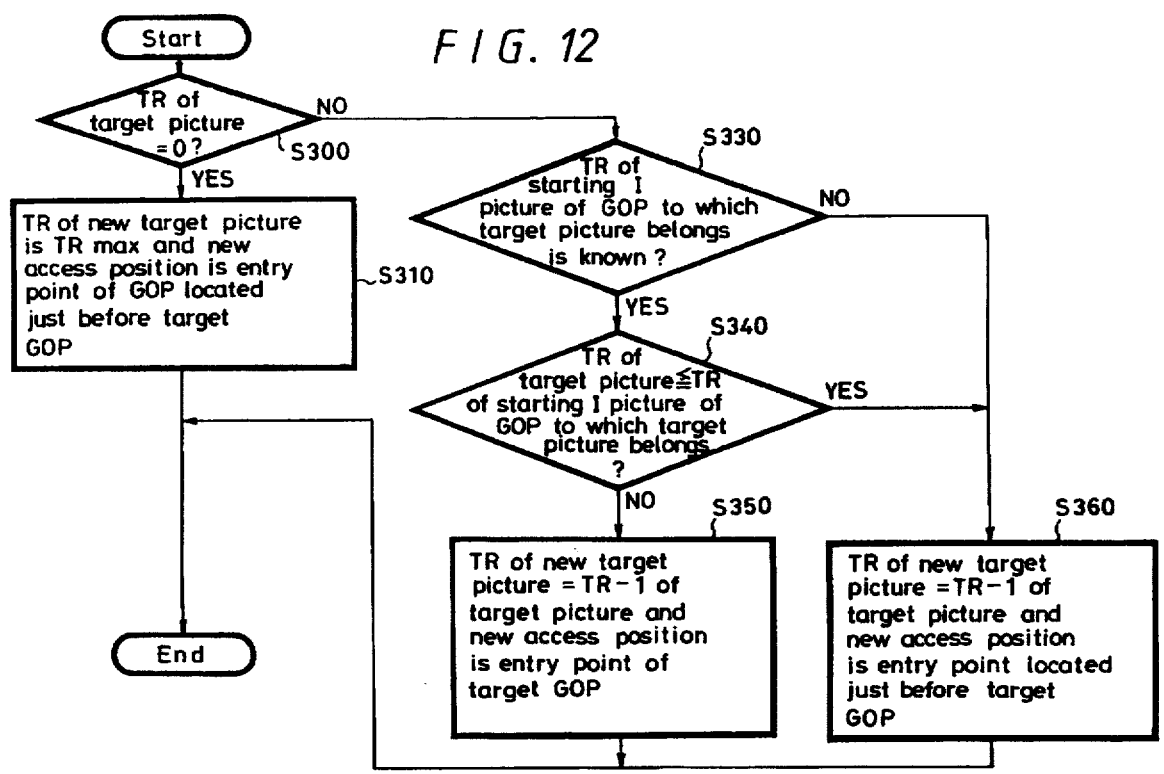
FIG. 12 is a flow chart to which reference will be made in describing the operation of the apparatus of FIG. 9.

Detailed operation of apparatus 80 in accordance with step S40 will be described in connection with FIG. 12. In this process, the temporal reference value of the next target picture, e.g. the next prior picture to be displayed, and the appropriate access point are determined by main controller 87.

In step S300, if the temporal reference value of the currently displayed picture, the target picture, equals zero, indicating that the first picture in the group of pictures has been reached, e.g. an I picture has been displayed, then processing proceeds with step S310. Otherwise, processing proceeds with step S330.

In step S310, the temporal reference value of the target picture is set to the maximum temporal reference value, for example $TR_{max}$. This maximum temporal reference value indicates the last picture in the group of pictures which precedes the target group. Also, the access point is redefined as the entry point of the group of pictures which precedes the target group. In this manner, the last picture of the preceding group of pictures is defined as the new target picture, and accordingly the identity of the target group and the value for the access point are adjusted.

In step S330, if the temporal reference value of the I picture at the beginning of the target group is known then processing proceeds with step S340; otherwise, processing proceeds with step S360.

In step S340, if the temporal reference value of the target picture is greater than the temporal reference value of the leading I picture of the target group, then processing proceeds with step S350. If the temporal reference value of the target picture is less than (or equal to) the temporal reference value of the leading I picture of the target group, then processing proceeds with step S360.

In step S350, the temporal reference value of the target picture is decremented by one to designate the new target picture while the access point and target group are left unchanged.

In step S360, the temporal reference value of the target picture is decremented by one to designate the new target picture while the access point is redefined as the entry point of the group of pictures which precedes the (old) target group. In this manner, the picture preceding the displayed picture is designated as the new target picture, and accordingly the identity of the target group and the value for the access point are adjusted.

Figure 13:
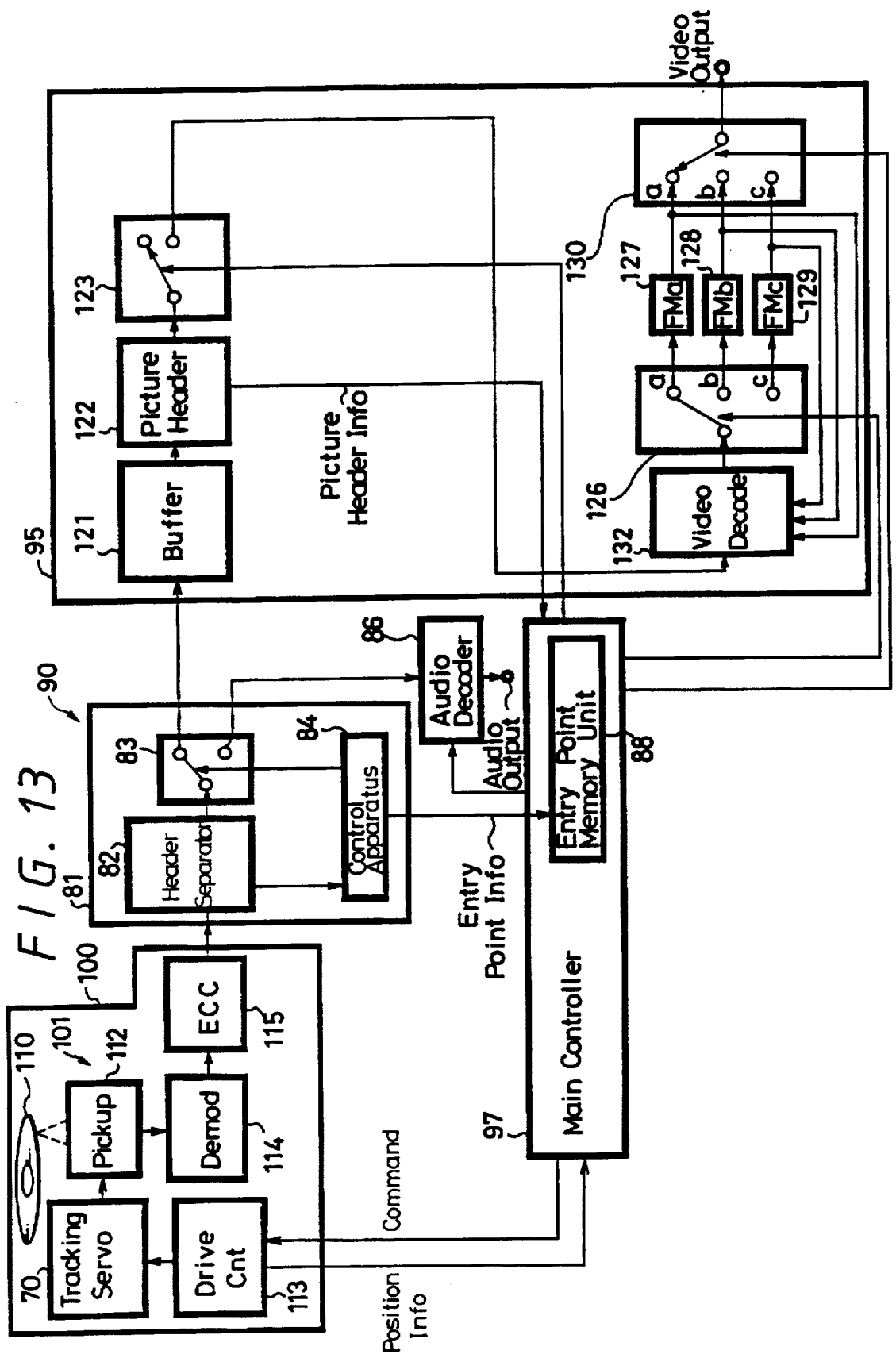
FIG. 13 is a block diagram of an audio and video data decoding apparatus for reverse playback of a time-division-multiplexed signal according to another embodiment of the present invention.

Another embodiment of an apparatus for reverse playback of a time-division-multiplexed signal according to the present invention is illustrated in FIG. 13 and generally indicated at 90. Those elements of FIG. 13 which have the same structure and function as corresponding elements of FIG. 9 have been marked with the reference markings used previously and repetitious description of such will be avoided.

Apparatus 90 is comprised of a digital storage device 100, a demultiplexer 81, a video decoder 95, an audio decoder 86, and a main controller 97. Digital storage device 100 accesses stored digital data as directed by command signals supplied from main controller 97. The reproduced digital data is supplied to demultiplexer 81 which separates the data into its various components. Video data components are supplied to video decoder 95 for selective decoding. Audio data components are supplied to audio decoder 86 for decoding. Entry point information is supplied to an entry point memory unit 88 contained within main controller 97. Main controller 97 controls the operation of digital storage medium 100 and video decoder 95 to decode stored video data for display in forward and reverse playback modes.

Video decoder 95 is comprised of a buffer 121; a picture header detector 122; switches 123, 126, and 130; a video decoder 132; and frame memories 127, 128, and 129. Buffer 121, detector 122, and switch 123 operate as described in connection with the previous embodiment. Video decoder 132 receives coded video data through switch 123 and can access decoded video data from each of frame memories 127, 128, and 129. Referring to decoded data in the frame memories as needed, video decoder 132 decodes the coded video data from switch 123 and supplies decoded video data to an input of switch 126. Preferably, signal decoder 132 is operable to decode signals encoded according to the MPEG2 standard.

Outputs a, b, and c of write control switch 126 are coupled to inputs of frame memories FMa, FMb, and FMc, respectively. Similarly, inputs a, b, and c of read control switch 130 are coupled to outputs of frame memories FMa, FMb, and FMc, respectively. The operational states of both switches 126 and 130 are controlled by main controller 97 as a function of picture header information supplied from picture header detector 122. Decoded data stored in the frame memories are accessed through switch 130 and supplied as the video output signal.

Figure 14:
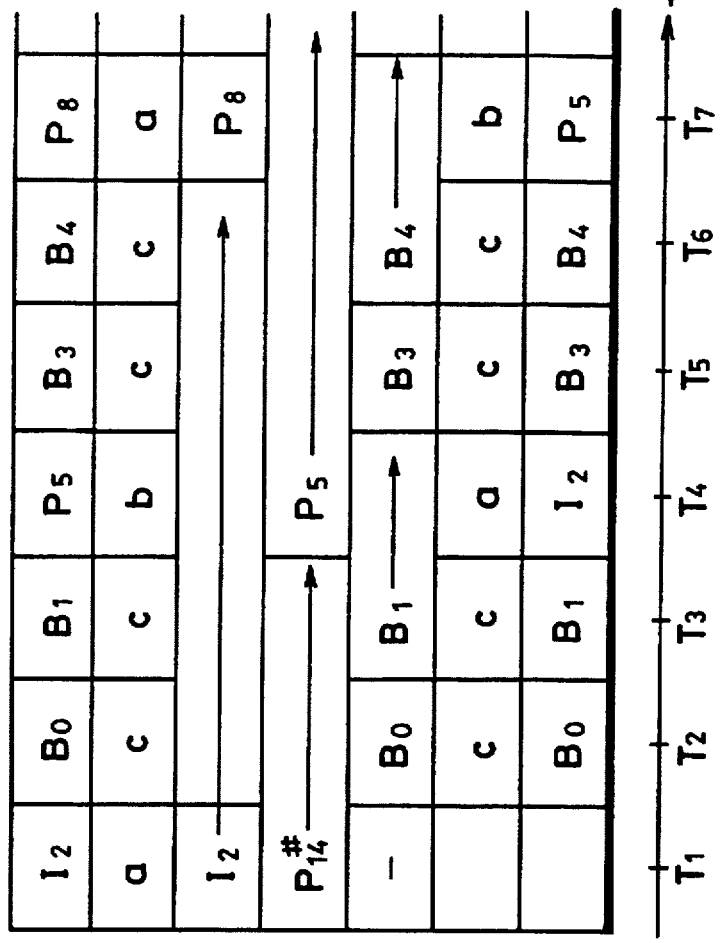
FIG. 14 is a timing chart to which reference will be made in describing the operation of the apparatus of FIG. 13.

Forward playback operation will be described in connection with the timing chart of FIG. 14. In the timing chart, the time axis extends horizontally and each horizontal row corresponds to a different data type or operational state. Row A indicates the picture retrieved from storage which is to be decoded. Row B indicates the output state of write control switch 126. Row C indicates the contents of frame memory 127 (FMa). Row D indicates the contents of frame memory 128 (FMb). Row E indicates the contents of frame memory 128 (FMc). Row F indicates the input state of read control switch 130. Row G indicates the decoded picture which is to be output as a video output signal for display.

At time $T_1$, picture $I_2$ is supplied to signal decoder 132 for decoding and main controller 97 controls switch 126 to supply the decoded picture data to memory 127 (FMa) which stores the decoded data from picture $I_2$.

Figure 2B:
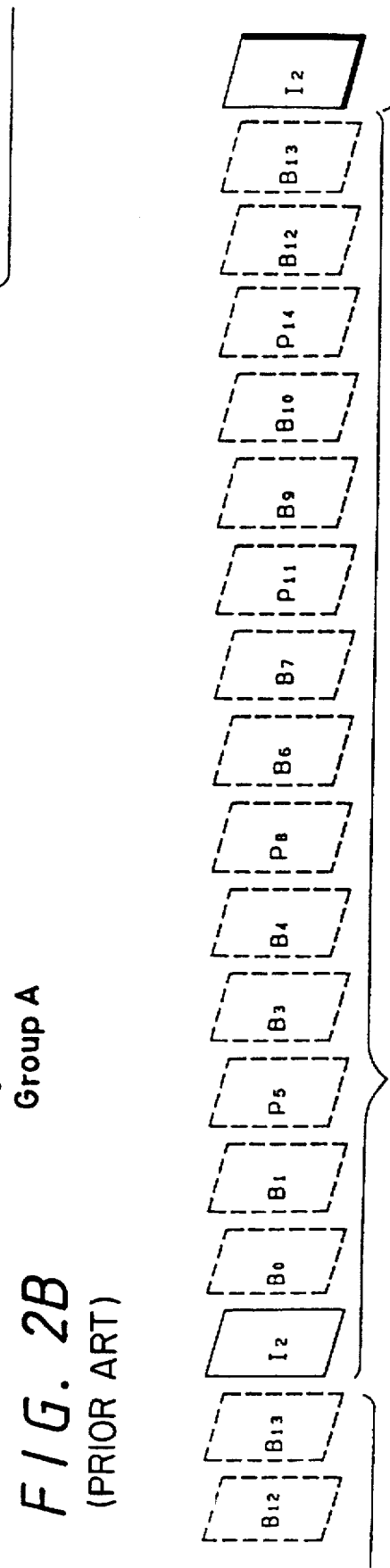
FIG. 2B is a diagram of an MPEG data format.
Figure 3:
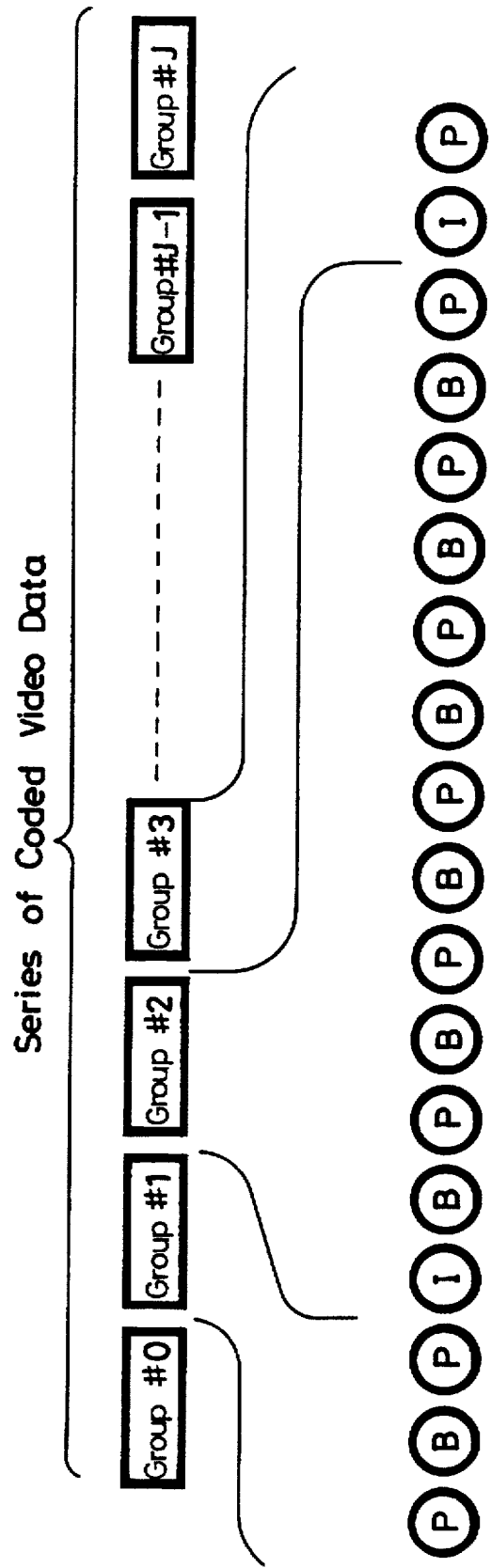
FIG. 3 is a diagram of another data format.
Figure 4:
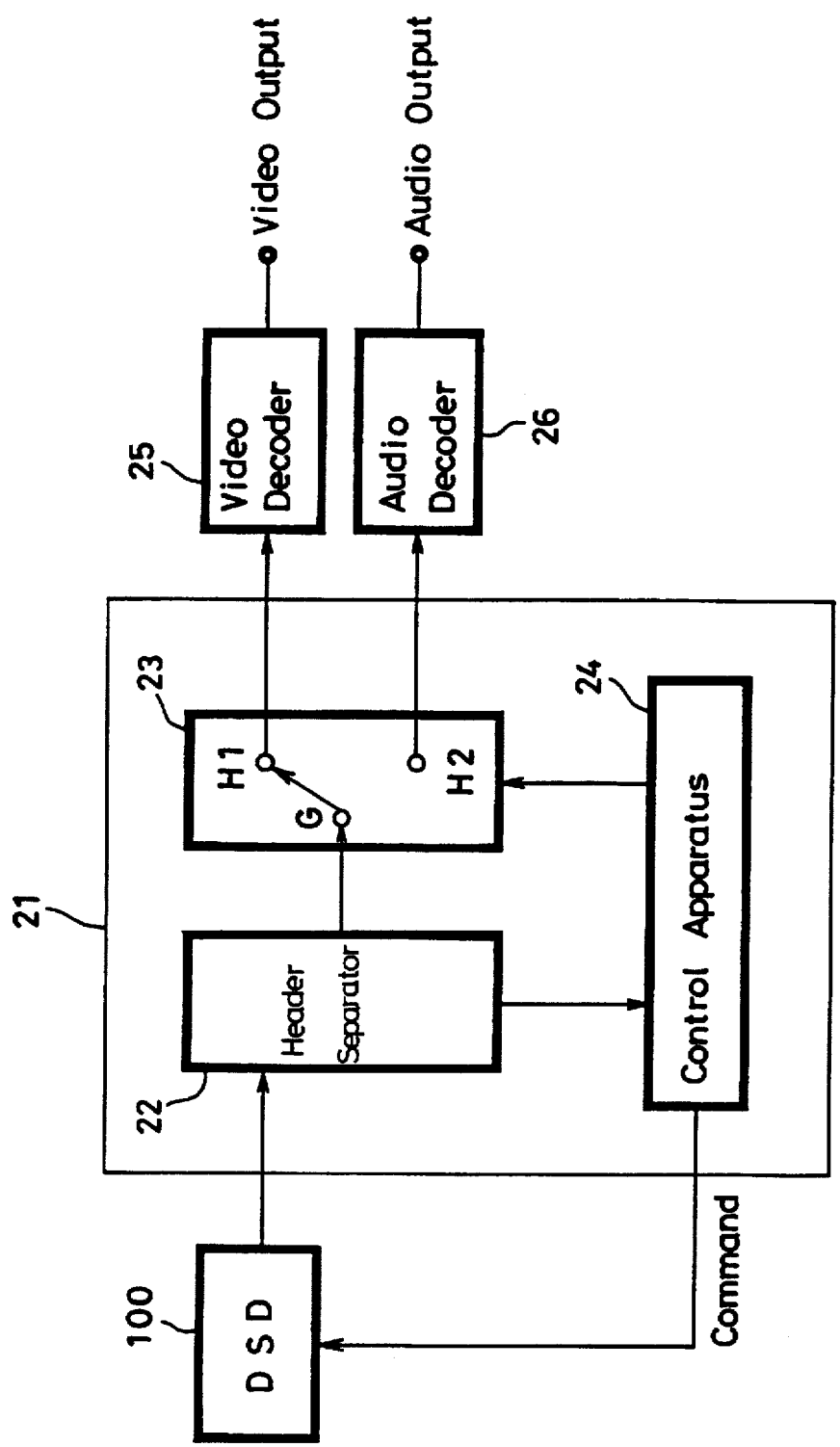
FIG. 4 is a block diagram of a proposed audio and video data decoding apparatus.
Figure 5:
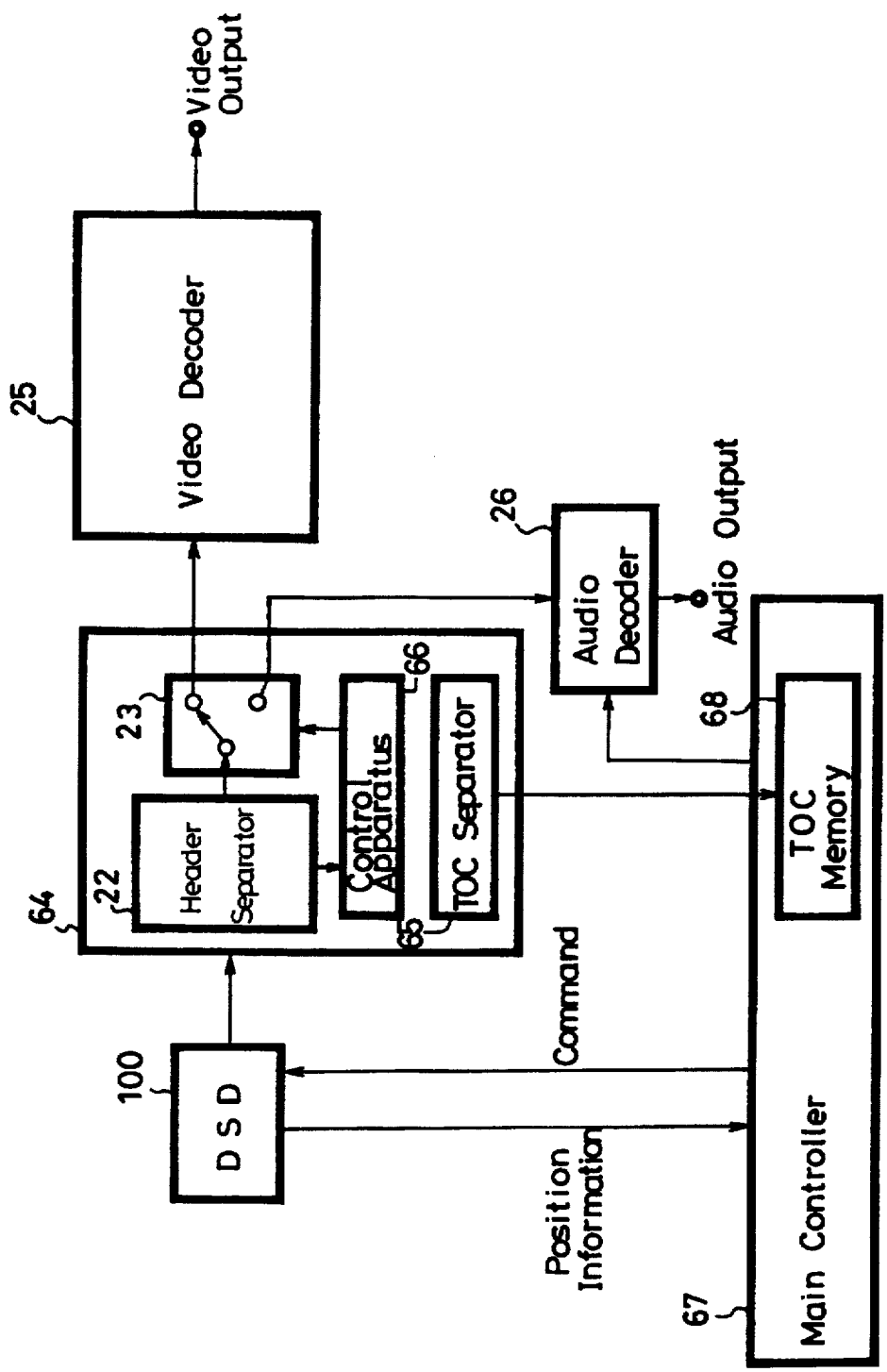
FIG. 5 is a block diagram of another proposed audio and video data decoding apparatus.
Figure 6:
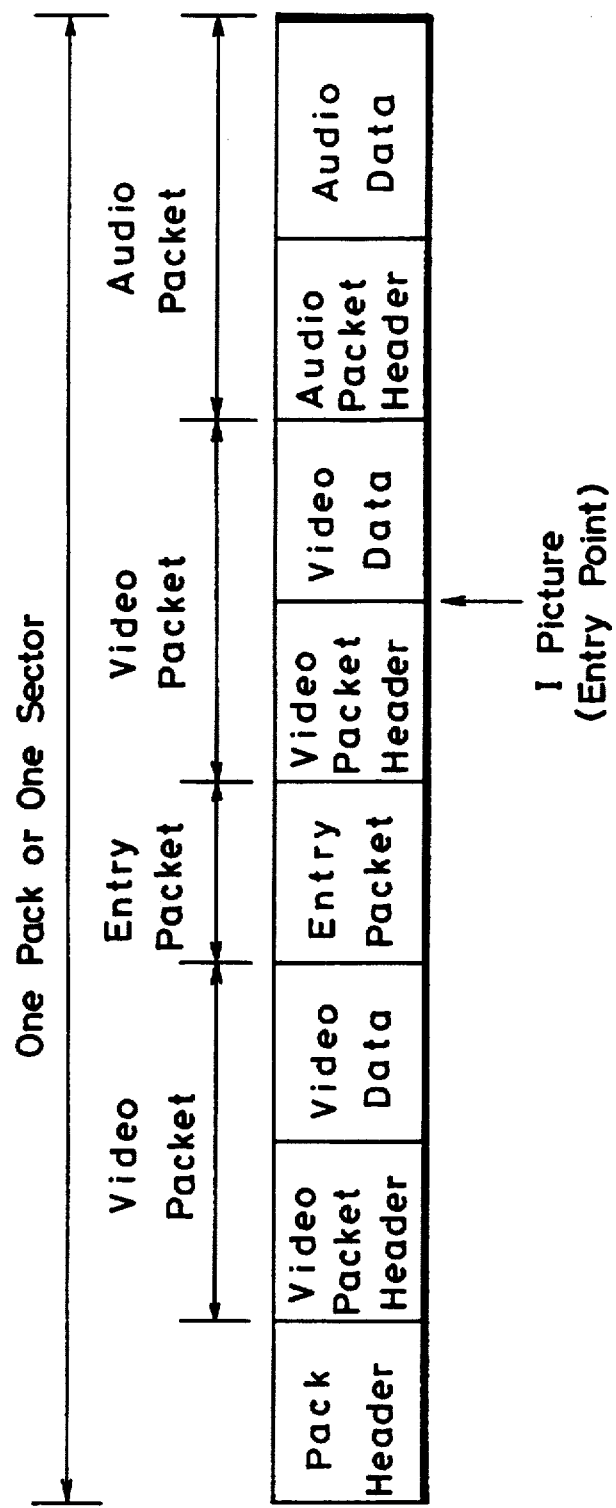
FIG. 6 is a diagram of another data format.
Figure 8:
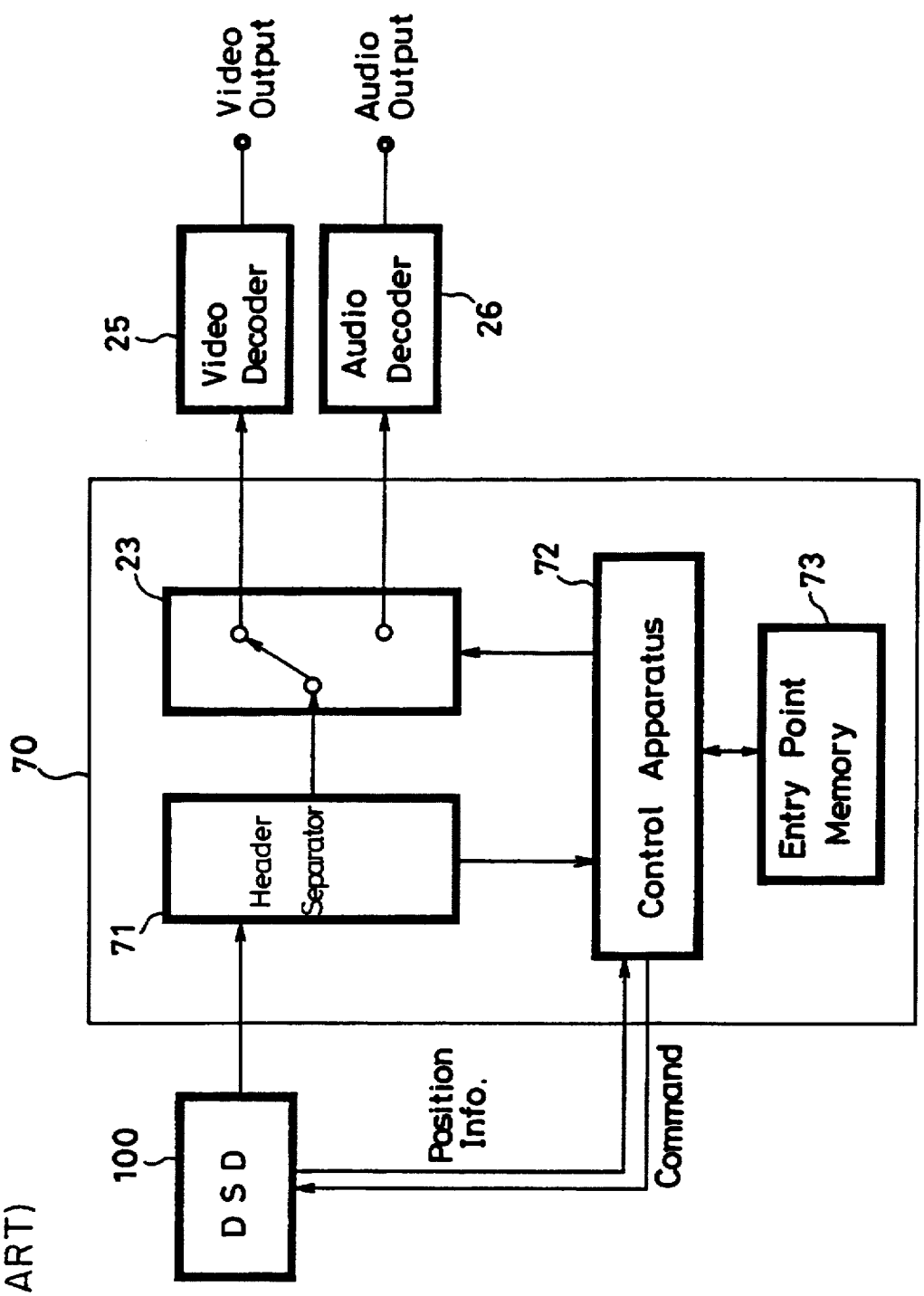
FIG. 8 is a block diagram of another proposed audio and video data decoding apparatus.

At time $T_2$, picture $B_2$ is supplied to signal decoder 132 for decoding with reference to the contents of FMa ($I_2$) and FMb ($P_{14}"$, the P picture occurring before $I_2$ and which is not shown on either FIG. 2A or 2B. Main controller 97 controls switch 126 to supply the decoded picture data to memory 129 (FMc) which stores the decoded data from picture $B_0$ and controls switch 130 to output the contents of memory 129.

At time $T_3$, picture $B_1$ is supplied to signal decoder 132 for decoding with reference to the contents of FMa ($I_2$) and FMb ($P_{14}"$, the P picture occurring before $I_2$ (not shown)). Main controller 97 controls switch 126 to supply the decoded picture data to memory 129 (FMc) which stores the decoded data from picture $B_1$ and controls switch 130 to output the contents of memory 129.

At time $T_4$, picture $P_5$ is supplied to signal decoder 132 for decoding with reference to the contents of FMa ($I_2$). Main controller 97 controls switch 126 to supply the decoded picture data to memory 128 (FMb) which stores the decoded data from picture $P_5$ and controls switch 130 to output the contents of FMa.

At time $T_5$, picture $B_3$ is supplied to signal decoder 132 for decoding with reference to the contents of FMa ($I_2$) and FMb ($P_5$). Main controller 97 controls switch 126 to supply the decoded picture data to memory 129 (FMc) which stores the decoded data from picture $B_3$ and controls switch 130 to output the contents of memory 129.

At time $T_6$, picture $B_4$ is supplied to signal decoder 132 for decoding with reference to the contents of FMa ($I_2$) and FMb ($P_5$). Main controller 97 controls switch 126 to supply the decoded picture data to memory 129 (FMc) which stores the decoded data from picture $B_4$ and controls switch 130 to output the contents of memory 129.

At time $T_7$, picture $P_8$ is supplied to signal decoder 132 for decoding with reference to the contents of FMb ($P_5$). Main controller 97 controls switch 126 to supply the decoded picture data to memory 127 (FMa) which stores the decoded data from picture $P_8$ and controls switch 130 to output the contents of FMb.

Following the pattern described above, stored video data is processed to produce the video output signal in forward playback mode. The frames of the video output signal thus produced have the same order as that illustrated in FIG. 2A.

Frame-by-frame-reverse playback operation which preferably occurs following a normal playback operation can be achieved with substantially the same processing steps described above in connection with the embodiment illustrated in FIG. 9. Reverse playback, slow-reverse playback, average-speed-reverse playback operations, and the like are achieved by repeating, at appropriate intervals, the frame-by-frame-reverse playback operation. As will be appreciated by one of ordinary skill, implementation of other reverse playback operations simply involves a repetitive application of these teachings.

In response to a user command for frame-by-frame-reverse playback, main controller 97 controls switch 130 to remain connected to the frame memory storing the currently displayed decoded picture data. Repeated output of the same stored picture for display produces the "frame hold" effect achieved in the prior embodiment with the external frame memory 89. Further processing to produce frame-by-frame-reverse playback follows the steps illustrated in FIGS. 10, 11, and 12, described in detail hereinabove, with appropriate substitution of references to elements of the apparatus of FIG. 9 for like elements of the embodiment illustrated in FIG. 13. However, decoding and display steps S140 and S170 require modification to accommodate the structural differences between the embodiments.

In step S140 main controller 97 controls switch 123 to route the retrieved picture data of the target picture to signal decoder 132 which decodes the picture data by drawing, as needed, upon decoded data stored in frame memories 127, 128, and 129. Since only one of the frame memories 127, 128, and 129 needs to store the currently displayed frame, I pictures and P pictures can be decoded by using the other two frame memories. The decoded I picture or P picture is stored in a frame memory and may be displayed by adjusting switch 130 to access that frame memory. Alternatively, the decoded data may be written over data in the frame memory storing the currently displayed frame by the process described below in connection with the decoding of B pictures.

To decode B pictures, I and/or P pictures stored in two a frame memories are accessed to decode the coded picture data and the decoded B picture data is written to the frame memory from which a picture is currently being displayed. Interference between the two images can be prevented by writing each field of the newly decoded B picture into a corresponding portion of the frame memory storing that field of the displayed image when that field is not being immediately accessed for display.

In step S170, main controller 97 controls switch 123 to route the retrieved picture data of the target picture to signal decoder 132 which decodes the picture data by drawing, as needed, upon decoded data stored in frame memories 127, 128, and 129. The decoded I picture or P picture is stored in one of the frame memories and is not displayed at this step.

The processing operation illustrated in FIG. 10 suffers the drawback that after the frame-by-frame-reverse playback command is entered by a user, the time-consuming, processing-intensive step of loading the picture to be displayed occurs. As a consequence, there may be a delay between entry of the user's command and actual display of the next prior frame of video data. Such a delay is undesirable.

Figure 15:
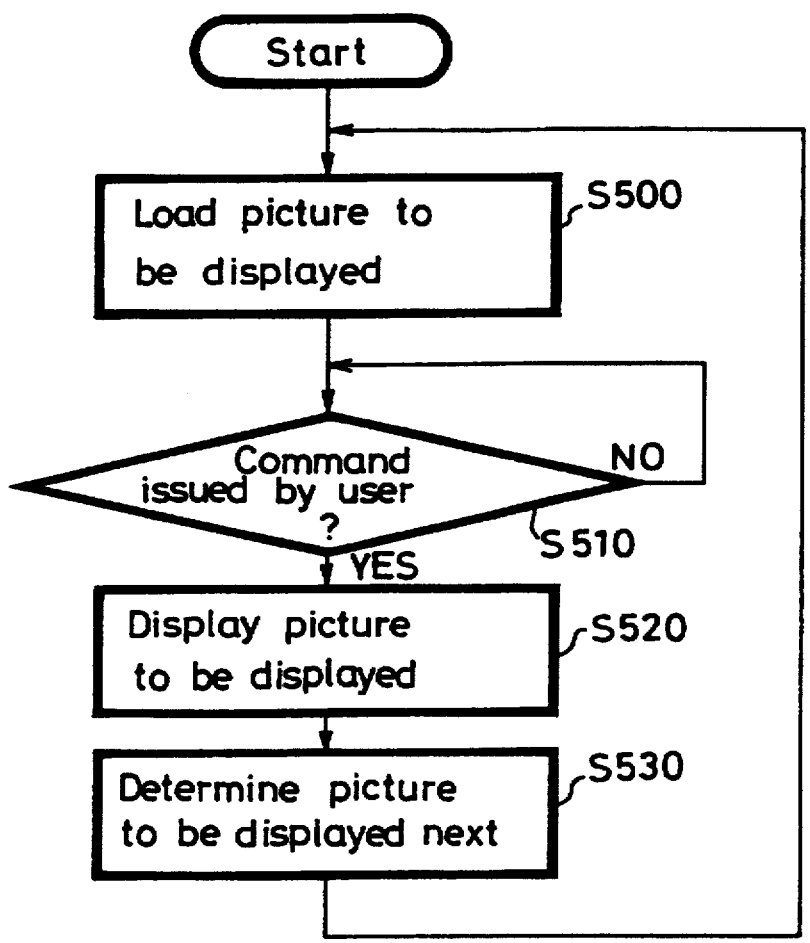
FIG. 15 is a flow chart to which reference will be made in describing an alternative operation of the apparatuses of FIGS. 9 and 13.

To avoid processing delay after the user's entry of the frame-by-frame-reverse playback command, an alternative to the processing operation illustrated in FIG. 10 is provided in FIG. 15. In the first step S500, main controller 87 (97) controls apparatus 80 (90) to retrieve from storage and decode a coded picture of video data. A user command to produce frame-by-frame-reverse playback is awaited in step S510. In step S520, the decoded picture is displayed to the user. Finally, in step S530, the next picture to be displayed is determined and the processing operation repeats with step S500. The details of this process are identical to those described in connection with the process of FIG. 10.

The process of FIG. 15 advantageously allows the decoding apparatus to retrieve and decode the next picture to be displayed before the user has actually requested the display of a previous frame of video data. When the user does enter such a command, the new picture, already decoded, can be quickly routed for display without delay.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. Method for decoding and reverse reproducing an encoded digital signal comprised of a plurality of data units which are stored in digital storage means at a plurality of respective data locations, and wherein a reverse playback operation commences at a selected one of said data units, said method comprising the steps of:

storing a first data location of a first decoding data unit which can be utilized in the decoding of said selected data unit;

storing a second data location of a second decoding data unit which cannot be utilized in the decoding of said selected data unit;

retrieving from said digital storage means at said first and second data locations said first and second decoding data units, respectively;

retrieving from said digital storage means a preceding data unit that immediately precedes said selected data unit in a forward playback order; and decoding said preceding data unit as a function of said first decoding data unit and of said second decoding data unit.

2. Method according to claim 1 further comprising the step of consecutively retrieving, from said digital storage means, a plurality of data units starting at said second data location until said first data location is reached.

3. Method according to claim 2 further comprising the step of decoding the retrieved data units which can be utilized in the decoding of said preceding data unit.

4. Method according to claim 3 further comprising the step of discarding the retrieved data units which cannot be utilized in the decoding of said preceding data unit.

* * * * *